United States Patent
Sonohara et al.

(10) Patent No.: US 8,803,378 B2
(45) Date of Patent: Aug. 12, 2014

(54) MOTOR GENERATOR FOR VEHICLE TECHNICAL FIELD

(75) Inventors: Tomoka Sonohara, Toyota (JP); Hiroaki Urano, Miyoshi (JP); Yasuji Taketsuna, Okazaki (JP); Satoshi Murata, Miyoshi (JP); Yasuaki Tahara, Nagoya (JP); Kenji Ishida, Nagoya (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 527 days.

(21) Appl. No.: 13/133,522

(22) PCT Filed: Nov. 10, 2009

(86) PCT No.: PCT/JP2009/069086
§ 371 (c)(1),
(2), (4) Date: Aug. 2, 2011

(87) PCT Pub. No.: WO2010/067680
PCT Pub. Date: Jun. 17, 2010

(65) Prior Publication Data
US 2011/0285220 A1    Nov. 24, 2011

(30) Foreign Application Priority Data
Dec. 9, 2008   (JP) .................. 2008-313491

(51) Int. Cl.
*H02K 9/00* (2006.01)
*H02K 11/00* (2006.01)
*H02K 9/19* (2006.01)
*H02K 9/193* (2006.01)
*H02K 5/22* (2006.01)

(52) U.S. Cl.
CPC .................. *H02K 9/19* (2013.01); *H02K 9/193* (2013.01); *H02K 9/00* (2013.01); *H02K 5/225* (2013.01); *H02K 11/0047* (2013.01)
USPC .................. 310/53; 310/52; 310/54; 310/58; 310/68 C; 310/71

(58) Field of Classification Search
CPC ..... H02K 9/00; H02K 5/225; H02K 11/0047; H02K 9/19; H02K 9/193
USPC ............................. 310/52–54, 58, 68 C, 71
IPC .............................................. H02K 9/00, 11/00
See application file for complete search history.

(56) References Cited

U.S. PATENT DOCUMENTS 4,224,461 A * 9/1980 Snyder et al. ................. 136/233
2002/0043883 A1* 4/2002 Shimizu ......................... 310/71

(Continued)

FOREIGN PATENT DOCUMENTS

DE   3534883 A1   4/1987
JP   61-205266 U  12/1986

(Continued)

OTHER PUBLICATIONS

German Office Action for corresponding DE Patent Application No. 11 2009 003 698.8 issued on Oct. 10, 2012.

(Continued)

*Primary Examiner* — John K Kim
(74) *Attorney, Agent, or Firm* — Sughrue Mion, PLLC

(57) ABSTRACT

A rotating electrical machine (100) is driven by a three-phase AC current and is provided with a stator core (13), a molded resin (12) for covering a coil wound on the stator core, a rotor core (40), a shaft (11) provided to the rotor core (40), a terminal base (20) provided to a coil end section, and a case (30) for covering the rotating electrical machine (100). Power cables extending from the terminal base (20) are led out of the case (30) through a case terminal box (31). A temperature sensor (22) is affixed in a hole in the molded resin (12) by the terminal base (20) and measures the temperature in the vicinity of a heat producing source.

4 Claims, 5 Drawing Sheets

(56) References Cited

U.S. PATENT DOCUMENTS

| | | | |
|---|---|---|---|
| 2003/0016476 A1* | 1/2003 | Yamamoto et al. | 361/25 |
| 2005/0285457 A1* | 12/2005 | Tsutsui et al. | 310/54 |
| 2007/0278869 A1* | 12/2007 | Taketsuna | 310/54 |
| 2008/0001486 A1* | 1/2008 | Smith | 310/52 |
| 2011/0285220 A1* | 11/2011 | Sonohara et al. | 310/53 |

FOREIGN PATENT DOCUMENTS

| | | |
|---|---|---|
| JP | 64-045474 U | 3/1989 |
| JP | 6-077470 U | 10/1994 |
| JP | 2003-032964 A | 1/2003 |
| JP | 2005-012961 A | 1/2005 |
| JP | 2006-203965 A | 8/2006 |
| JP | 2008-022679 A | 1/2008 |
| JP | 2008-029127 A | 2/2008 |
| JP | 2008-131775 A | 6/2008 |
| JP | 2008-136324 A | 6/2008 |

OTHER PUBLICATIONS

Japanese Office Action for corresponding JP 2008-313491 dated Feb. 9, 2010.

International Search Report for PCT/JP2009/069086 dated Feb. 9, 2010.

\* cited by examiner

MOTOR GENERATOR FOR VEHICLE TECHNICAL FIELD

CROSS REFERENCE TO RELATED APPLICATIONS

This application is a National Stage of International Application No. PCT/JP2009/069086, filed Nov. 10, 2009, claiming priority based on Japanese Patent Application No. 2008-313491, filed Dec. 9, 2008, the contents of all of which are incorporated herein by reference in their entirety.

TECHNICAL FIELD

The present invention relates to a motor generator for a vehicle, that is cooled by a cooling medium, and in particular relates to a terminal block for attaching a temperature sensor for measuring temperature of coil end section of the motor generator.

BACKGROUND ART

With motor generators such as a motor and electrical generator used in an electric vehicle or hybrid vehicle or the like, coils generate heat due to iron loss and resistance, and so cooling means that use air cooling or a cooling medium are provided in a motor generator. However, in a motor generator heat is generated due to prolonged use and excessive load, etc., and there are cases of overheating when cooling using a cooling medium is insufficient. Conventionally, therefore, temperature of each section of the motor generator is measured, and control is carried out such that in the event that a measured temperature exceeds a predetermined temperature the load on the motor generator is limited, or the motor generator is stopped.

Generally, with motor generators for vehicles, motor generators of inverter controlled three-phase alternating current type are often used. Since this type of motor generator is integrally mounted in a vehicle together with an engine and a transmission, a method for cooling by circulating oil, which is a cooling medium, inside the motor generator is adopted. In the case of measuring temperature of the motor generator, a method of measuring the temperature of coil end sections, where the coils are exposed from slots in the stator core, is easy, and so coil end temperature measurement is often used. However, there have been situations where if a temperature sensor is attached to a coil end section or the like, a measured temperature is higher or lower than the actual temperature due to oil that spills onto the temperature sensor.

Accordingly, patent document 1 discloses technology for carrying out measurement of coil end section with good precision, while simultaneously attempting to reduce the size of a motor generator for a vehicle, by protecting an insulating layer for an outer surface of a neutral point fixed to a coil end section of a motor generator for a vehicle. Also, patent document 2 discloses a motor generator that prevents positional slip of a temperature sensor fixed to a coil end section, and in which a coil is molded using resin with the object of protecting the coil, having a temperature sensor that is inserted into a hole formed in a resin section.

PRIOR ART DOCUMENTS

Patent Documents

Patent Document 1: JP 2008-29127 A
Patent Document 2: JP 2008-136324 A

SUMMARY OF THE INVENTION

According to above described patent document 2, it is possible to suppress positional slip of a temperature sensor by supporting the image sensor at prescribed inner surfaces by a coil hole that has been molded using resin, enabling coil temperature measurement without temperature measurement problems. However, with this method, the temperature sensor that has been inserted into the coil hole must be adhered to the hole, and all around filled in with adhesive, and it is also necessary to separately fit terminal blocks for fixing the U-phase, V-phase and W-phase extending from the coil, which means that there is a desire for additional reduction in the number of components and the number of fittings.

It is therefore an object of the present invention to provide a terminal block for attaching a temperature sensor for measuring temperature of coil end section of the motor generator, that suppresses temperature measurement variations, and enables a reduction in the number of components and the number of assembly steps.

In order to achieve the above mentioned object, a motor generator for a vehicle cooled by a cooling medium of the present invention comprises a coil provided in a cylindrical stator, a temperature sensor for detecting temperature of coil end section that have been resin molded, and a terminal block for housing the temperature sensor in a hole formed at the coil end section and bringing the temperature sensor into contact with the coil end section at a predetermined load, and also connecting terminals extending from the coils.

Also, in the motor generator for a vehicle of the present invention the terminal block covers the temperature sensor from an outer side in a circumferential direction of the coil end section, and has a flow restraint member for restricting flow of cooling medium around the temperature sensor.

In the motor generator for a vehicle of the present invention, a cooling medium sump and a cooling medium flow path, extending from the cooling medium sump to underneath the terminal block, are provided in the terminal block, and cooling medium flows in a cooling medium flow path provided inside the terminal block.

In the motor generator for a vehicle of the present invention, the cooling medium path is arranged apart from the temperature sensor by a predetermined distance in order for the temperature sensor to stably measure temperature of a core site of the coil end section.

Further, in the motor generator for a vehicle of the present invention, the cooling medium sump of the terminal block is arranged at an upper side of the cooling medium flow path, and cooling medium runs down through the cooling medium flow path under the force of gravity.

By using the present invention it is possible to provide a terminal block that reliably holds a temperature sensor for measuring temperature of coil end section, that suppresses temperature measurement variations of the temperature sensor, and enables a reduction in the number of components and the number of assembly steps.

BEST MODE FOR CARRYING OUT THE INVENTION

In the following, preferred embodiments (hereafter referred to as embodiments) of the present invention will be described in accordance with the drawings.

Figure 1:
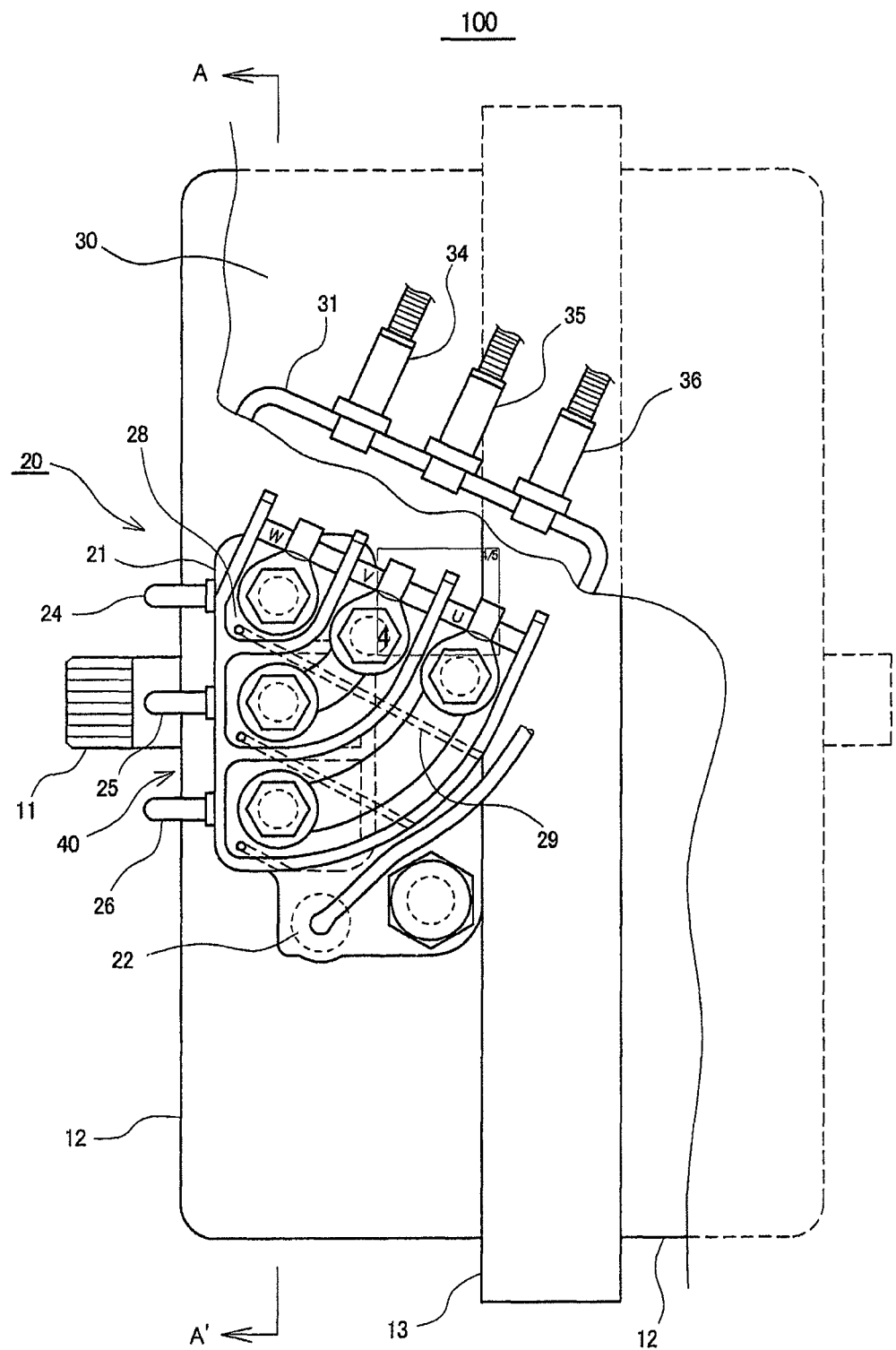
FIG. 1 is a side view showing the structure of a motor generator for a vehicle of an embodiment of the present invention.

FIG. 1 shows the structure of a motor generator 100 for a vehicle built-in to a transmission. The motor generator 100 is driven by three-phase AC current, and comprises a stator core 13, mold resin 12 covering coils wound around the stator core 13, a rotor core 40, a shaft 11 provided on the rotor core, a terminal block 20 provided on a coil end section, and a case 30 covering the motor generator 100. A plurality of power cables 34, 35, 36 extending from the terminal block 20 are led out to the outside of the case 30 via a case terminal box 31. A temperature sensor 22 is fixed in a hole of the mold resin 12 by the terminal block 20, and this temperature sensor 22 measures temperature near a heat generating source.

Figure 2:
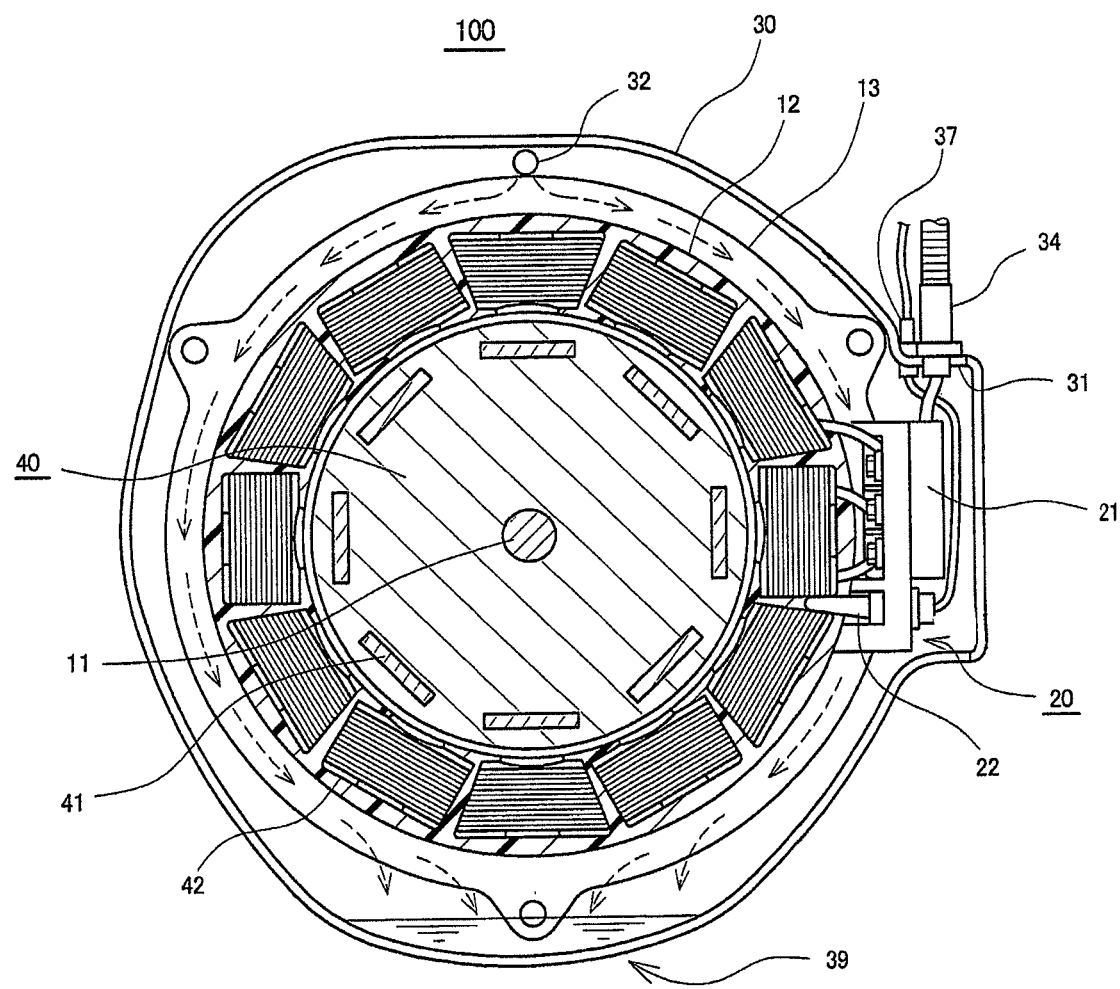
FIG. 2 is a cross sectional drawing showing the cross sectional structure of the motor generator for a vehicle of the embodiment of the present invention.

FIG. 2 shows the structure of a cross section A-N of the motor generator 100 shown in FIG. 1. The rotor core 40 of the motor generator 100 has the shaft 11 at its center, and a plurality of permanent magnets 41 arranged circumferentially around the outside. The stator core 13 is arranged at an outer side of the rotor core 40, U-phase, V-phase and W-phase coils 42 are wound around the stator core 13, and ends of these coils are connected to respectively corresponding electrodes of the terminal block 20. Also, a cooling oil discharge port 32 is provided above the motor generator, the coil end section and the terminal block 20 are cooled by oil that has been introduced to the outer periphery of the coil end section, and oil is collected by an oil sump 39 below the motor generator.

Figure 3:
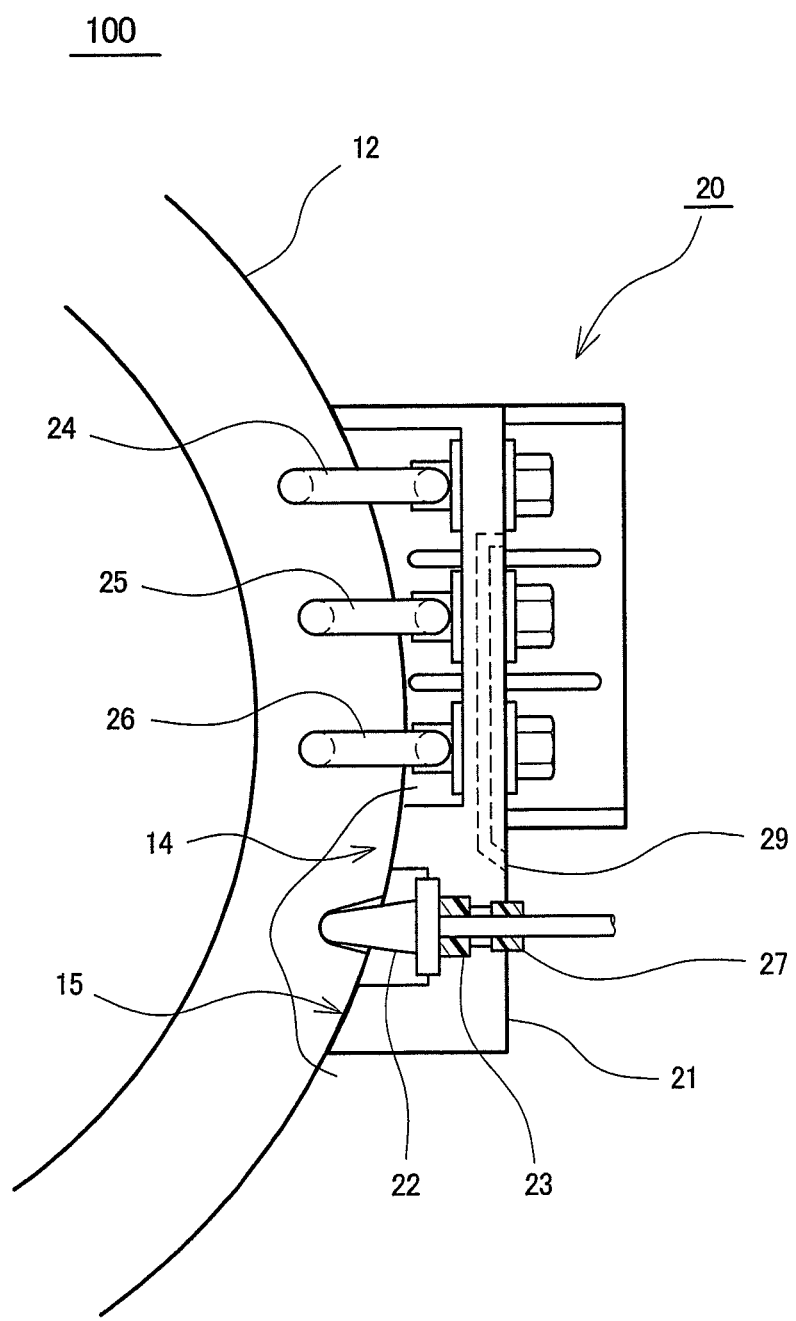
FIG. 3 is an explanatory drawing for describing the structure of a terminal block of an embodiment of the present invention.

The structure of the terminal block 20 of the motor generator 100 is shown in FIG. 3. With the present invention, one distinguishing feature is that the U-phase coil terminal 24, V-phase coil terminal 25 and W-phase coil terminal 26 are provided at an oil upstream side, while the temperature sensor 22 is arranged at the downstream side. Further, an oil flow restricting member (14, 15) for restricting flow of oil by sealing up the outer periphery of the temperature sensor 22 is provided. With this type of structure, oil is prevented from directly affecting the temperature sensor 22, and temperature measurement variations of the temperature sensor 22 are suppressed by a predetermined amount of oil flowing in the oil flow path 29. This oil flow path 29 also contributes to stator cooling, and a predetermined heat dissipation is realized even if there is partial restriction of heat dissipation by the terminal block 20.

The temperature sensor 22 of FIG. 3 detects temperature at the tip end of the temperature sensor 22, and so it is inserted into the central part of the mold resin 12. Since the tip end of the temperature sensor 22 is adhered to the mold resin 12, an elastic pressing member such as a spring or rubber is provided between the temperature sensor 22 and a base 21 of the terminal block 20, and a seal 27 for preventing leakage of oil from a cable of the temperature sensor 22 is also provided. By adopting this type of structure, it becomes possible to maintain stable contact, even if there is dimensional variation due to manufacturing tolerances or heat expansion, or excessive vibration caused by the motor generator.

Figure 4:
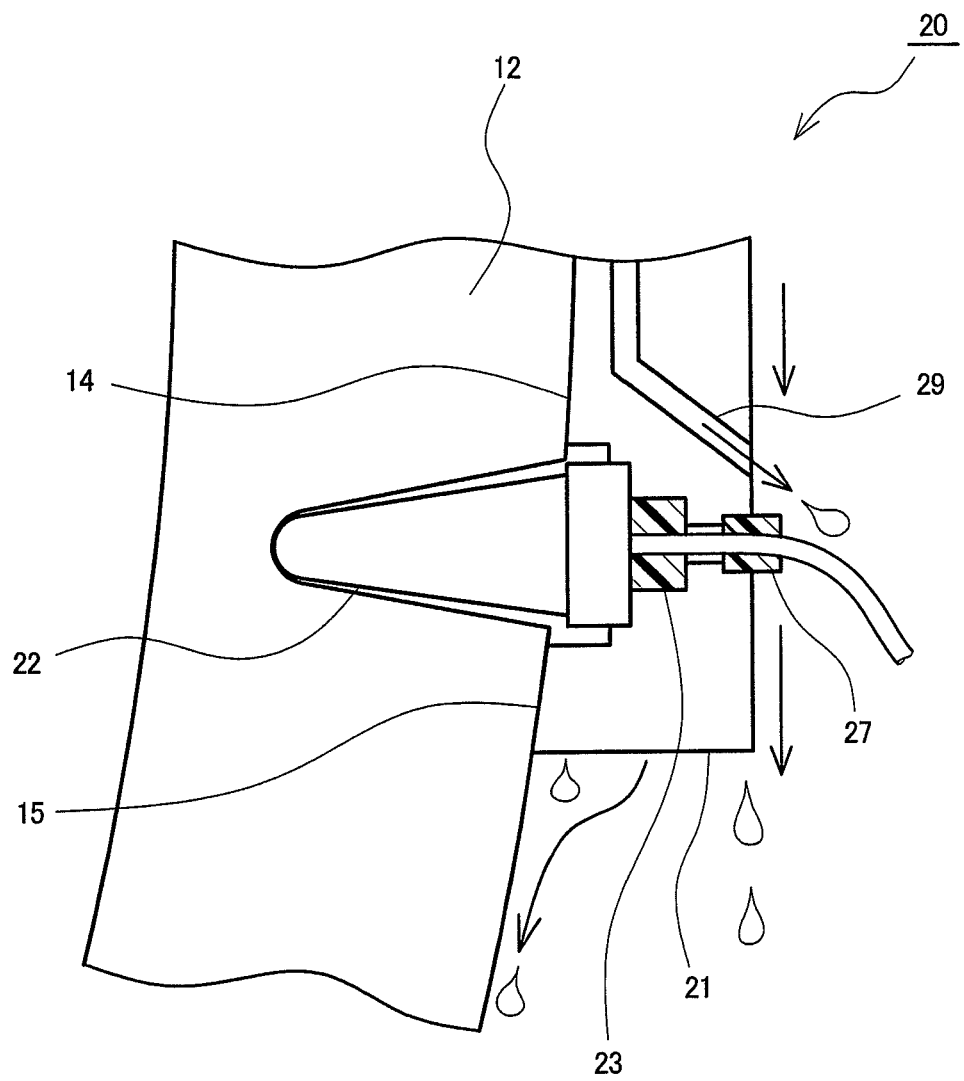
FIG. 4 is an explanatory drawing for describing a temperature sensor attachment structure of the terminal block of the embodiment of the present invention.

FIG. 4 shows a temperate sensor attachment structure and oil flow of the terminal block 20. One distinguishing feature of the present invention is that not only the surface of the terminal block 20, but also the inside of the terminal block 20 is cooled, and so the inside of the terminal block 20 is cooled by having a structure with the oil sump 28 shown in FIG. 1, and in the oil sump 28 flows in the oil flow path 29.

As shown in FIG. 4, together with oil flowing around the terminal block 20, oil that has collected in the oil sump 28 of FIG. 1 flows through the oil flow path 29 under the force of gravity. Further, since the terminal block 20 has a plurality of oil flow paths 29, it becomes possible to cool not only the surface of the terminal block 20 but also the mold resin 12 that is covered by the terminal block 20. By optimizing the shape of the terminal block 20 and the oil flow path 29 so that the temperature sensor 22 does not generate any temperature measurement discrepancies with variation in cooling by the oil, it is made possible to correctly measure high temperatures, and a reduction in the number of assembly steps of the temperature sensor 22 is also made possible.

Figure 5:
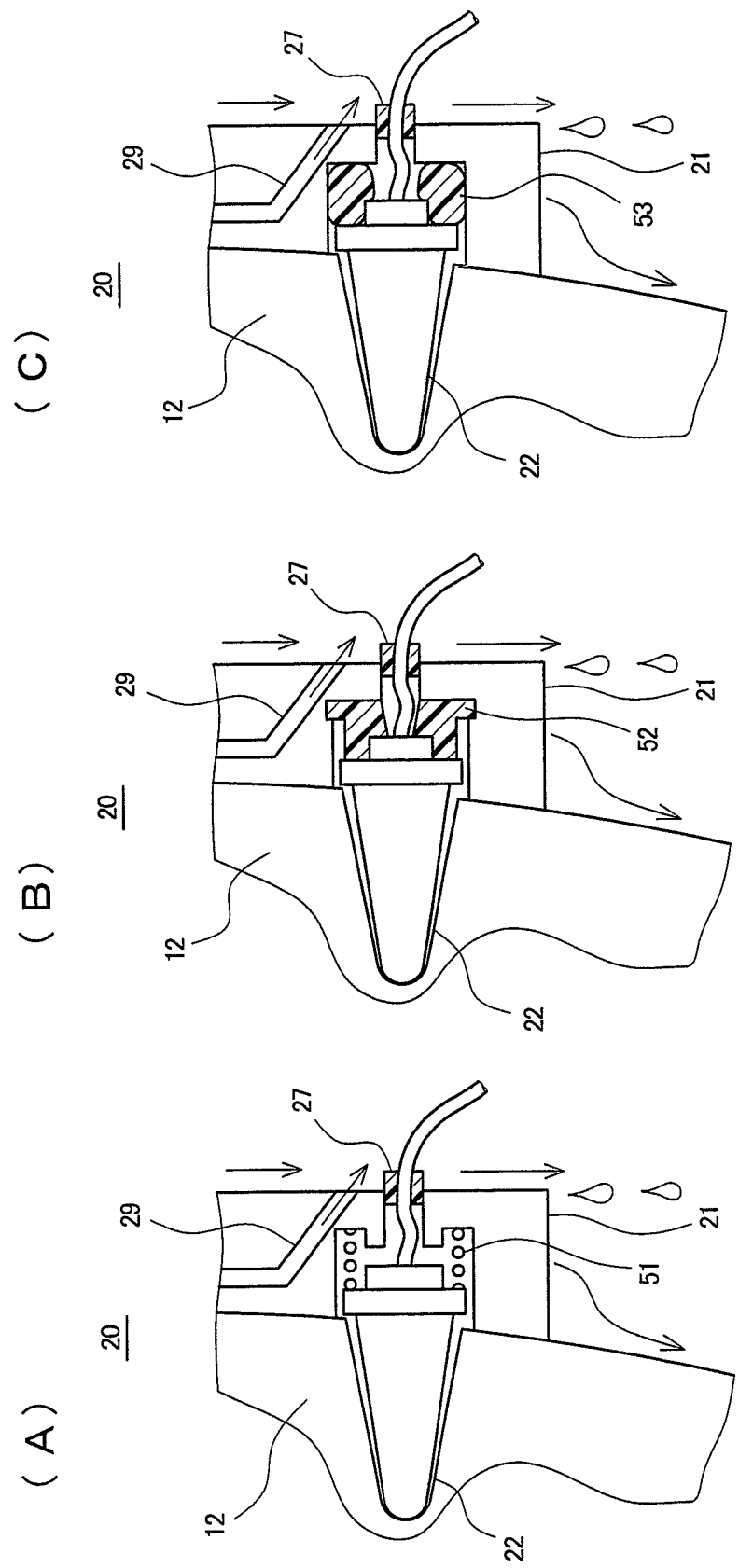
FIG. 5 is an explanatory drawing for describing a temperature sensor attachment structure of another embodiment of the present invention.

A heat sensor attachment structure of other embodiments of the present invention is shown in FIG. 5(A) to FIG. 5(C). FIG. 5(A) is a structure for pressing the temperature sensor 22 against the mold resin 12 using a spring 51 having small variation in pressing force due to temperature variation. In FIG. 5(B) of the structure, although pressing force varies slightly due to temperature variation, it is possible to integrate the temperature sensor 22 with the terminal block 20 using a flange shape provided on the bottom of an elastic body 52 and an indent portion holding the temperature sensor 22, and it is possible to reduce the number of assembly steps. In FIG. 5(C), the temperature sensor 22 is held in the terminal block 20 by a large O-ring 53 so that it is possible to obtain pressing force.

As has been described above, by using the terminal block of this embodiment, it is possible to provide a terminal block in which a temperature sensor for measuring temperature of coil end section is pressed against and held by mold resin with an appropriate load, temperature measurement variations of the temperature sensor are suppressed, and that enables a reduction in the number of components and the number of assembly steps.

DESCRIPTION OF THE REFERENCE NUMERALS 11 shaft, 12 mold resin, 13 stator core, 14, 15 oil flow restricting member, 20 terminal block, 21 base section, 22 temperature sensor, 23 pressing member, 27 seal, 29 oil flow path, 30 case, 31 case terminal box, 40 rotor core, 41 permanent magnet, 42 coil, 51 spring, 52 elastic body, 53 O-ring, 100 motor generator

The invention claimed is:

1. A motor generator, for a vehicle cooled by a cooling medium, comprising:
   a coil provided in a cylindrical stator;
   a temperature sensor for detecting temperatures of coil end section that has been resin molded; and
   a terminal block for housing the temperature sensor in a hole formed at the coil end section and bringing the temperature sensor into contact with the coil end section at a predetermined load, and also connecting terminals extending from the coil,
   wherein the terminal block covers the temperature sensor from an outer side in a circumferential direction of the coil end section, and has a flow restraint member for restricting flow of the cooling medium around the temperature sensor, and wherein an elastic pressing member is provided between the temperature sensor and a base member of the terminal block, so that the elastic pressing member presses the temperature sensor direction away from the base member and against the mold resin.

2. A motor generator, for a vehicle, cooled by a cooling medium, comprising:

a coil provided in a cylindrical stator;

a temperature sensor for detecting temperatures of coil end section that has been resin molded; and a terminal block for housing the temperature sensor in a hole formed at the coil end section and bringing the temperature sensor into contact with the coil end section at a predetermined load, and also connecting terminals extending from the coil, wherein the terminal block covers the temperature sensor from an outer side in a circumferential direction of the coil end section, and has a flow restraint member for restricting flow of the cooling medium around the temperature sensor, wherein a cooling medium sump and a cooling medium flow path, extending from the cooling medium sump to underneath the terminal block, are provided in the terminal block, and the cooling medium flows in a cooling medium flow path provided inside the terminal block.

3. The motor generator for a vehicle of claim 2, wherein the cooling medium path is arranged apart from the temperature sensor by a predetermined distance in order for the temperature sensor to stably measure temperature of core sites of the coil end section.

4. The motor generator for a vehicle of claim 2, wherein the cooling medium sump of the terminal block is arranged at an upper side of the cooling medium flow path, and the cooling medium runs down through the cooling medium flow path under the force of gravity.

* * * * *